Dec. 2, 1924.　　　　　　　　　　　　　　　　　　　1,517,319
F. SEYBOTH
WET FUEL FURNACE
Filed June 3, 1922　　　　　　2 Sheets-Sheet 1

Dec. 2, 1924.

F. SEYBOTH 1,517,319

WET FUEL FURNACE

Filed June 3, 1922  2 Sheets—Sheet 2

Fritz Seyboth
Inventor:
by Wood-Blue
Attorneys

Patented Dec. 2, 1924.

1,517,319

UNITED STATES PATENT OFFICE.

FRITZ SEYBOTH, OF ZWICKAU, GERMANY.

WET-FUEL FURNACE.

Application filed June 3, 1922. Serial No. 565,711.

*To all whom it may concern:*

Be it known that I, FRITZ SEYBOTH, of German nationality, residing at 6 Amalienstrasse, Zwickau, Saxony, Germany, have invented certain new and useful Improvements in and Relating to Wet-Fuel Furnaces; and I do hereby declare the following to be a full, clear, and exact description of the invention, of which the following is a specification.

Inferior fuels containing a large amount water, such as bagasse, (extracted and crushed sugar cane) cellulose shavings, raw lignite and others, are unsuitable for burning on ordinary grates, partly on account of their small heating effect and partly on account of their tendency to form very hard clinker which is difficult to remove from the grate and the adjacent brick work.

The invention relates to a device for more economically and conveniently utilizing such fuel and it mainly consists in the provision of improved means for a preliminary drying of the fuel in the furnace prior to burning and for removing and re-using the vapours to secure proper combustion and to largely prevent the formation of clinkers.

The accompanying drawings illustrate two modifications of the invention by way of example.

Figure 1:
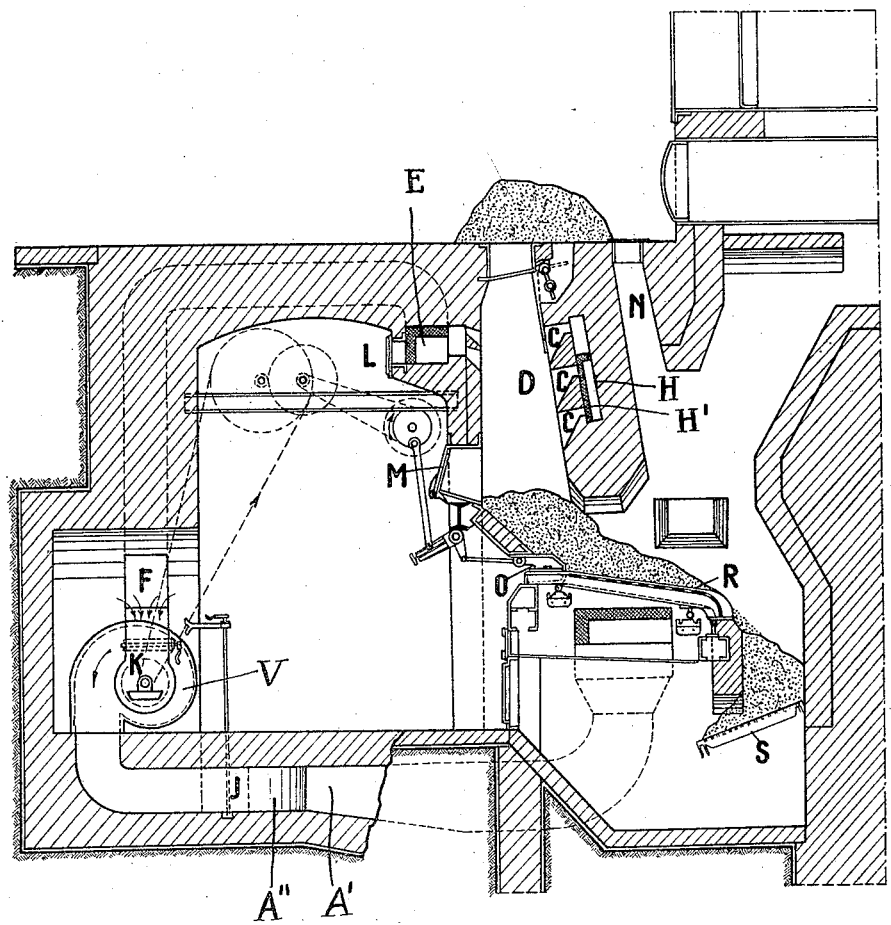
Figure 2:
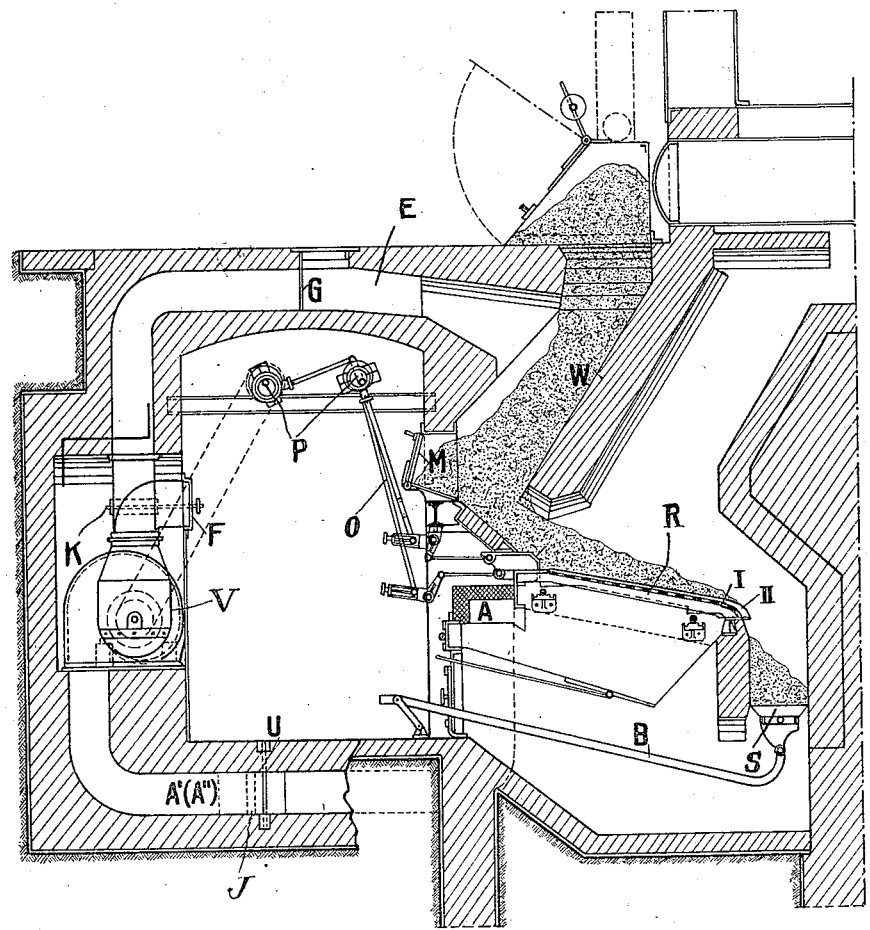

Fig. 1 is a vertical section through one type of the improved furnace having a vertical drying chamber, and Fig. 2 is a similar sectional view of a modified form of furnace in which a sloped drying chamber is employed.

According to the arrangement shown in Fig. 1 the inferior fuel is supplied to the furnace through a chute D serving as a drying chamber and closed by a counterweighted trap door, which is adapted to open when a certain weight of fuel rests upon it. This feeding chute is normally closed. Preliminary drying of the wet fuel takes place partly by the action of heat radiating from the furnace and partly by means of fresh air drawn in by a ventilator through a channel H, and ports C. The fresh air thus absorbs the moisture and vapours from the fuel and thereby materially enhances the efficiency of the drying action. However, this way of admitting the fresh air may be dispensed with and air directly taken from the supply chute, i. e., the preheating chamber, may be used. For this purpose the inlet opening for the fresh air channel H is provided with a damper H' by means of which one or more of the ports C may be closed. The hot and moist air is then drawn through the passage E by a ventilator V and is then blown underneath the inclined grate R which is arranged as a continuation of the supply chute or drying chamber D. Thus the grate is working with a hot and moist and upwardly directed blast, which decreases the formation of clinker on the grate to a minimum, whilst at the same time materially increasing the rate of combustion.

The inclined grate R consists preferably of bars placed side by side and resting on rollers upon which they may be reciprocated by the arrangement of some grate shaking device which, in the drawing, is indicated by the link and lever mechanism O.

In order to regulate the degree of moisture and temperature of the hot air which is forced by the ventilator underneath the grate, an opening F is provided on the suction side of the ventilator, through which a surplus amount of fresh air may be admitted. The ventilator may also be constructed as a double acting fan with two suction conduits, of which one would communicate directly with the opening F, and the other with the supply chute D by means of the passage E. Each of these two passages may then preferably be regulated by means of dampers such as K, so that the ratio of fresh air to the moist and hot blast under the grate coming from the supply chute may be varied at will. Mixing of the fresh air with the air drawn from the supply chute may be effected in the ventilator itself. The pressure side of the same may either open into a single or a branched passage or conduit, of which latter one arm, A', would lead to a point underneath the grate and the other, A'', into the atmosphere, a valve J being provided to regulate the quantity of moist air supplied to the grate.

If dry fuel, such as wood, coke and the like is to be burnt in the furnace separately from the moist material, an additional supply chute N may be provided, through which the dry fuel may be introduced.

A door L in the conduit E serves to enable the removal of parts of the fuel which may have been drawn into the said conduit, and the furnace door M is provided to give access to the firing grate R and the clinker grate S arranged beneath the same, for example for stoking purposes to ensure an after burning of unconsumed residues.

In the modification shown in Fig. 2, the supply chute for the wet fuel is likewise constructed to serve as a drying chamber, and its inclined bottom W is constructed as a fire brick wall heated by the hot combustion gases constantly impinging upon it. In this case no provision is made for a fresh air conduit to the drying chamber. The vapours are drawn off by means of a ventilator, V through a conduit E as in the former example and, during their passage, they are strained by a strainer G in order to retain particles of fuel rushing through the conduit. The opening of the supply chute or drying shaft is normally closed so that no fresh air is allowed to enter. The draught of the ventilator may be regulated by means of dampers such as U.

From the drying chamber the preliminarily dried material slides with a reversed direction of motion on to a movable inclined grate R arranged for forced draught under the grate. The effective grate surface of this inclined grate gradually decreases from the front towards the rear, and its inclination may be altered by adjusting the height of its back support in order to make the accumulation of the clinkers correspond to the quality of the fuel. The means to effect such adjustment are not shown in the drawing as they do not form part of the invention.

The projecting bars II of this inclined grate are made of strong channel iron. They are supported on rollers and are adapted to be reciprocated in variable strokes by means of the link and lever mechanism O and eccentric P. The grate bars I are rigidly supported and do not move. In this way the fuel is slowly fed along the grate and then drops on a clinker grate S, which, when removing the clinker, may be tilted by means of a lever arrangement B. The inclined grate R is provided with a portion into which a flap door is fitted through which material which has dropped through the grate may be removed.

As a rule a single ventilator will be sufficient. It is preferably arranged with two suction conduits of which one, E, is connected with the drying chamber whilst the other, F, draws in fresh air from the atmosphere. The quantity of moist vapours and fresh air admitted may be regulated as by means of the damper K. The ventilator V forces the mixture of fresh air and vapours into a conduit A', separated by a partition from another conduit A". The damper J controls the branch of the conduit leading to the flue and enables either all the vapours or a mixture of vapours and air to be passed into the flue. Only part of them may be passed into said fuel flue the other part being led to a point beneath the inclined grate R through the channel A. It is obvious that in this way the blast under the inclined grate may be very definitely controlled, not only with regard to quantity, but also with respect to the moisture contained therein.

In the arrangement illustrated the clinker grate S may be supplied with natural draught, and an excess of fresh air need not be feared as owing to the employment of a blast under inclined grate a moderate draught in the furnace chamber will be quite sufficient.

At the lower end of the drying chamber a door M may be provided, which may be opened during work in order to obtain access to the grate should this be required.

What I claim is:—

1. In a wet fuel furnace having a flue, the combination of a preheating chamber adapted to preheat the wet fuel, a furnace chamber, said preheating chamber being located so that hot combustion gases are free to pass directly through said preheating chamber to heat the wet fuel thereof, a grate located in the said furnace chamber and adapted to receive the preheated fuel thereof, a passage connecting the said preheating chamber and the said furnace at a point below the said grate, means adapted to supply a regulated amount of fresh air through the said passage into the furnace, and means adapted to cause and to regulate the passage of vapors from the said preheating chamber into the said furnace.

2. In a wet fuel furnace in combination, a chute-like preheating chamber for the wet fuel, a furnace grate in consecutive connection therewith, ports in the walls of the said chamber for the exit of the vapours, a channel in connection with the ports, a fresh air port in the said channel, a ventilator to draw the vapours from the preheating chamber and fresh air through the air port, a branched passage through which the vapours and fresh air are forced partly to underneath the grate and partly away from the furnace, and means to regulate the amount of vapours and air admitted to the grate.

3. In a wet fuel furnace in combination, a chute-like preheating chamber for the wet fuel, a furnace grate below said preheating chamber and consecutively arranged therewith, a passage to admit fresh air into the preheating chamber, a passage for the withdrawal of the vapours from the said chamber, means in the said passage to force a mixture of the vapours and air to underneath the furnace grate, and means to regulate the mixture admitted to the grate both in richness and in amount.

4. In a wet fuel furnace in combination, a chute-like preheating chamber for the wet fuel, a furnace grate below said preheating chamber, and consecutively arranged therewith, a passage emanating into a number of ports to admit fresh air into the preheating chamber, a passage for the withdrawl of the vapours and air from the said chamber and having port openings into the atmosphere, a ventilator within said passage, dampers to regulate the amount of vapours and air passed through the passage, a branched passage at the delivery side of the ventilator, one branch leading to underneath the grate and the other branch leading away from the grate, and dampers to regulate the flow of the mixture towards and away from the grate.

5. In a wet fuel furnace in combination, a chute-like preheating chamber to supply the wet fuel into the grate, a furnace chamber, a grate in said furnace chamber below the preheating chamber and consecutively arranged therewith, an auxiliary supply chute for the introduction of dry fuel, air supply and vapour withdrawl passages in communication with the preheating chamber, means to force the vapours and air from the preheating chamber into the furnace chamber at a place underneath the grate, and regulating organs to control the mixture of vapours and air passing through the passage both in richness and amount.

In testimony whereof I have signed my name to this specification in the presence of two subscribing witnesses.

FRITZ SEYBOTH.

Witnesses:
 MARGARET L. MENZEL,
 CECILIA FOBURG.